US007092032B1

(12) United States Patent
Matsunaga et al.

(10) Patent No.: US 7,092,032 B1
(45) Date of Patent: Aug. 15, 2006

(54) SCANNING CONVERSION CIRCUIT

(75) Inventors: Seiji Matsunaga, Kanagawa-ken (JP);
Junichi Onodera, Kanagawa-ken (JP);
Makoto Ikeda, Kanagawa-ken (JP)

(73) Assignee: Fujitsu General Limited, Kanagawa-Ken (JP)

( * ) Notice: Subject to any disclaimer, the term of this patent is extended or adjusted under 35 U.S.C. 154(b) by 546 days.

(21) Appl. No.: 10/182,500

(22) PCT Filed: Sep. 22, 2000

(86) PCT No.: PCT/JP00/06539

§ 371 (c)(1),
(2), (4) Date: Jul. 26, 2002

(87) PCT Pub. No.: WO01/56282

PCT Pub. Date: Aug. 2, 2001

(30) Foreign Application Priority Data

Jan. 28, 2000 (JP) ............................ 2000-020559
Jan. 28, 2000 (JP) ............................ 2000-020563

(51) Int. Cl.
*H04N 7/01* (2006.01)
(52) U.S. Cl. ...................................... 348/452; 348/448
(58) Field of Classification Search ............... 348/452, 348/448, 458, 700, 701
See application file for complete search history.

(56) References Cited

U.S. PATENT DOCUMENTS

| 5,786,862 | A | * | 7/1998 | Kim et al. | 348/448 |
| 5,796,437 | A | * | 8/1998 | Muraji et al. | 348/452 |
| 5,936,676 | A | * | 8/1999 | Ledinh et al. | 348/452 |
| 6,122,017 | A | * | 9/2000 | Taubman | 348/620 |
| 6,181,382 | B1 | * | 1/2001 | Kieu et al. | 348/459 |
| 6,215,525 | B1 | * | 4/2001 | Fujino | 348/452 |
| 6,288,745 | B1 | * | 9/2001 | Okuno et al. | 348/448 |
| 6,421,090 | B1 | * | 7/2002 | Jiang et al. | 348/452 |

FOREIGN PATENT DOCUMENTS

JP           2-312381       12/1990

(Continued)

*Primary Examiner*—Victor R. Kostak
(74) *Attorney, Agent, or Firm*—Flynn, Thiel, Boutell & Tanis, P.C.

(57) ABSTRACT

A scanning conversion circuit which interpolates an image signal of an interpolation scanning line from an input image signal Vi of a scanning line adjacent to the upside or downside of an interpolation scanning line to output an image signal Vp doubled in scanning line, and which comprises a directivity detection unit (50) for detecting, in order to prevent an unnatural view of a slant line when a moving image is displayed with an image signal Vp, a direction having the strongest correlation out of a plurality of directions, including a vertical direction and a slant direction, centering on an interpolation point of an interpolation scanning line based on the signal Vi, and an average value computing unit (56) for computing an average value of image signals at two sampling points corresponding to the detected direction out of a plurality of sampling points in an upside scanning line and downside scanning line. When the directivity detection unit (50) judges that a slant-direction correlation is the strongest, the average value computing unit (56) computes an average value of image signals at corresponding and slant-direction two sampling points in an upside scanning line and downside scanning line to process the value as an image signal of an interpolation scanning line, thereby permitting a proper interpolation processing an a slant line in a moving image.

19 Claims, 8 Drawing Sheets

| FOREIGN PATENT DOCUMENTS | | | JP | 4-366894 | 12/1992 |
|---|---|---|---|---|---|
| | | | JP | 5-153562 | 6/1993 |
| JP | 3-108889 | 5/1991 | JP | 11-331773 | 11/1999 |
| JP | 4-343590 | 11/1992 | | | |
| JP | 4-364685 | 12/1992 | * cited by examiner | | |

Fig. 6
(a) When Moving Image(K=0), In-field Interpolation
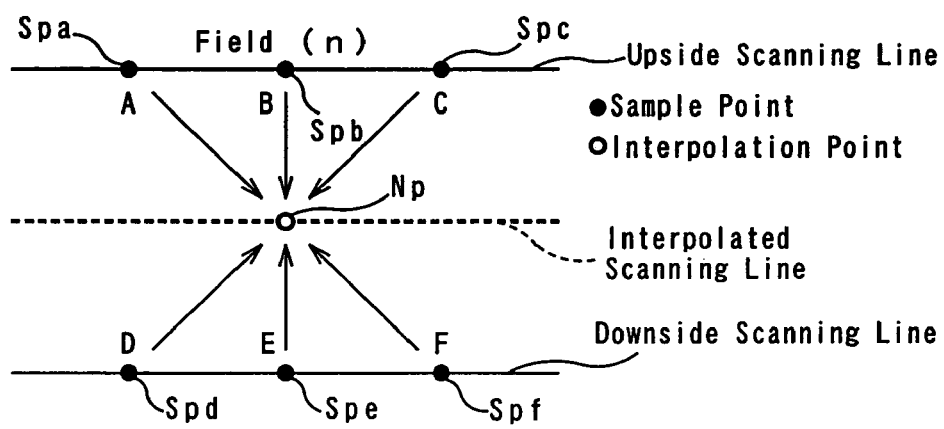
(b) When Still Image(K=1), Interfield Interpolation
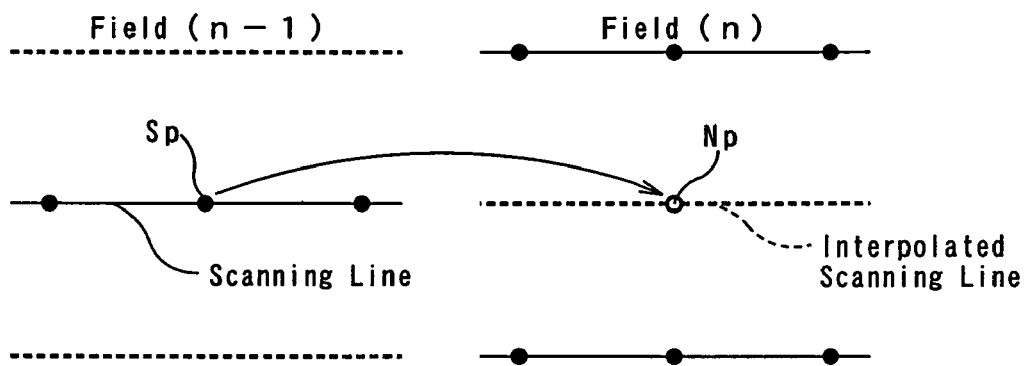

SCANNING CONVERSION CIRCUIT

TECHNICAL FIELD

The present invention relates to a scanning conversion circuit designed for outputting a video signal (e.g., a video signal for progressive scanning) whose number of scanning lines is doubled by interpolating the video signal of the interpolated scanning line from the input video signal of the upper adjacent scanning line and the lower adjacent scanning line to the interpolated scanning line.

For instance, in the case of digital video signal processing in a display unit using a PDP (Plasma Display Panel) or LCD (Liquid Crystal Display) panel as the display panel, the present invention is applicable in converting a video signal for interlace scanning to a video signal for progressive scanning.

BACKGROUND ART

Conventionally, as seen from FIG. 1, a scanning conversion circuit comprises a 262H delayer 12, a 1H delayer 14, a 262H delayer 16, adders 18 and 20, a constant multiplier 22, coefficient-variable constant multipliers 24 and 26, a movement detecting section 28 and a double-speed converting section 36.

The movement detecting section 28 detects the movement of the image on the bases of the video signal Vi (e.g., video signal according to the NTSC system) for the interlace scanning inputted to the input terminal 10, and the signal delayed by 525H (1H represents 1 line, and 525H is equivalent to the delay by 1 frame) by means of the 262H delaying section 12, 1H delaying section 14 and 262H delaying section 16. More specifically, the signals of the detected movement (1−K) and K, which become K=0 in the case of the moving image and K=1 in the case of the still image.

The adder 18 adds the output signal of the 262H delayer and the output signal of the 1H delayer 14, and the constant multiplier 22 multiplies the output signal of the adder 18 by the coefficient ½. Therefore, the constant multiplier 22 outputs the video signal obtained by averaging the video signals of the upper scanning line and the lower scanning line to the interpolated scanning line. This video signal corresponds to the video signal for the in-field interpolation processing.

One of the coefficient-variable constant multipliers 24 and 26 multiplies the video signal, which has been delayed by 1 field by means of the 252H delaying section (the video signal for interfield interpolation processing), by the signal detected by the movement detecting section 28 and outputs the result, while the other constant multiplier 26 multiplies the output signal of the constant multiplier 22 by the detected signal (1−K) from the movement detecting section 28 to output the result.

The adder 20 adds the output signal of the constant multiplier 24 and the output signal of the constant multiplier 26 to obtain the video signal (the video signal of the interpolation signal) for the interpolated scanning line.

Therefore, since K=0 in the case of a moving image, the coefficients of the constant multipliers 24 and 26 becomes 0 and 1, so that only the video signal, obtained by averaging the video signals of the upper adjacent scanning line and the lower adjacent scanning line, is outputted from the adder 20, and since K=1 in the case of the still image, the coefficients of the constant multipliers 24 and 26 are reversed to become 1 and 0, whereby only the video signal preceding by 1 field is outputted from the adder 20.

For instance, in the case of a moving image, the video signal of the interpolation point Np of the interpolated scanning line becomes the signal obtained by averaging the video signals of the sampling points Sp and Sp in the vertical direction from the upper and lower adjacent scanning lines, while, in the case of a still image, as indicated by the arrow followed by the dotted line, the signal becomes the video signal of the sampling point Sp corresponding to the field (n−1) preceding by 1 field.

The double speed converting section 36 is capable of performing double speed conversion processing by using a double-speed clock in reading out the video signal Vi, delayed by 263H by means of the 262H delaying section 12 and the 1H delaying section 14, and the output signal of the adder 20, which have been stored in the memory, to output the video signal Vp for progressive scanning.

The double speed converting section 36, for example, though not limited to this example, comprises a first memory (e.g., a line memory) for storing the video signal outputted from the 1H delaying section 14 and a second memory (e.g., a line memory) for storing the video signal of the interpolated scanning line outputted from the adder 20, whereby the video signal Vp for progressive scanning is outputted from the output terminal 38 by reading out the data stored in the first and the second memories alternately for each 1 line by using the double-speed clock.

However, the conventional scanning conversion circuit shown in FIG. 1 has a drawback in that the inclined lines in the moving image appear unnatural.

For instance, when the inclined line 40 having 2-dot width appears in the moving image, the two interpolation points Np1 and Np2 included in the inclined line 40 of the interpolated scanning line becomes the signal obtained by averaging the video signals of the sampling points Spb and Spc of the upper scanning line and the sampling points Spe and Spf of the lower scanning line. In consequence, the interpolation points Np1 and Np2 have a half-lighted state (gray color between block color and white color) despite being required to have a lighted state (white color), and the outer two interpolation points Np3 and Np4 have a half-lighted state despite being required to have a non-lighted state (block color), thereby causing a problem that these interpolation points look unnatural.

The present invention is made in consideration of the above-mentioned problem and is intended to provide a scanning conversion circuit capable of preventing the vertical line and inclined lines in the moving image from appearing unnatural and reproducing a high-quality image when the moving image is displayed on the basis of a video signal (e.g., a video signal for progressive scanning) which has undergone scanning conversion processing.

DISCLOSURE OF THE INVENTION

In the present invention, the scanning conversion circuit is designed for outputting a video signal whose number of scanning line is doubled by incorporating the video signal of the interpolated scanning line from the input video signals of the upper adjacent scanning line and the lower adjacent scanning line respectively adjacent to the interpolated scanning line, and comprises a direction detecting section for detecting the best correlating direction out of a plurality of the directions including the vertical direction and the inclined directions centering around the interpolation point of the interpolated scanning line, and an average value computing section for computing the average value of the video signals of the two sampling points corresponding to the direction detected by the direction detecting section out of a plurality of sampling points on the upper scanning line and the lower scanning line to obtain the video signal of the interpolated scanning line.

With the scanning conversion circuit designed as discussed above, when the direction detecting section finds that the inclined direction is best correlating, the average value computing section computes the average value of the video signals for the two sampling points corresponding to the inclined direction out of a plurality of the sampling points on the upper scanning line and the lower scanning line and processed as the video signal of the interpolated scanning line, whereby optimal interpolation processing can be made for the inclined lines in the moving image.

Further, when the direction detecting section finds that the vertical direction is best correlating, the average value computing section computes the average value of the video signals of two sampling points corresponding to the vertical direction out of a plurality of sampling points on the upper scanning line and the lower scanning line, and the average value is processed as being the video signal of the interpolated scanning line, whereby the optimal interpolation processing can be made for the inclined lines in the moving image.

In the present invention, the scanning conversion circuit, wherein the movement of the image is detected on the basis of the inputted video signal for interlace scanning; the video signal of the interpolation point is obtained by combining the video signal for the interfield interpolation processing and the video signal for the in-field interpolation processing on the basis of the movement detecting signal; the video signal for progressive scanning is outputted by subjecting the video signal of the interpolation point and the input video signal to the double speed conversion processing, comprises the direction detecting section for detecting the best correlating direction out of a plurality of directions including the vertical and inclined directions centering around the interpolation point of the interpolated scanning line on the bases of the input video signals of a plurality of interpolation points on the upper adjacent scanning line and the lower adjacent scanning line to the interpolated scanning line, and the average value computing section for computing the average value of the video signals of the two sampling points corresponding to the direction detected by the direction detecting section out of a plurality of sampling points on the upper scanning line and the lower scanning line.

With the scanning conversion circuit designed as discussed above, when the direction detecting section finds that the inclined direction (or the vertical direction) is best correlating, similarly to the case of the invention previously discussed, the optimal in-field interpolation processing can be made for the inclined line (or the vertical line) in the moving image.

Differing from the invention discussed previously, in the invention, in order for the interpolation processing of the vertical line and the lines inclined leftward and rightward centering around said vertical line to be made properly, the direction detecting section is designed to detect the best correlating direction out of (2n+1) directions (n being an integer of 1 or more) including the vertical direction and the lines inclining leftward and rightward centering around the interpolation point of the interpolated scanning line. In other words, the direction detecting section detects the best correlating direction out of the vertical direction and directions inclining leftward and rightward centering around the interpolation point, so that proper interpolation processing can be made for the vertical line and the lines inclining leftward and rightward in the moving image.

Differing from the previously discussed invention, the invention, in order to simplify the composition of the average value computing section, the average value computing section comprises a first selecting section for selecting a video signal for 1 sampling point out of the (2n+1) sampling points on the upper scanning line on the basis of the direction detecting signal from the direction detecting section, a second selecting section for selecting the video signal of 1 sampling point out of the (2n+1) sampling points on the lower scanning line on the basis of the direction detecting signal from the direction detecting section, an adding section for adding the signals selected by the first selecting section and the second selecting section, and a constant multiplier for multiplying the output signal from the adding section by the coefficient ½ to obtain the video signal of the interpolated scanning line (or the video signal for the in-field interpolation processing).

Differing from the invention discussed above, the invention, in order to simplify the composition of the average value computing section, the average value computing section comprises an adding section for adding the video signals of each 2 sampling points of (2n+1) directions centering around the interpolation point of the interpolated scanning line out of the (2n+1) sampling points on the upper scanning line and the lower scanning line, a constant multiplier for multiplying each of the (2n+1) output signals from the adding section, and a selecting section for selecting one output signal corresponding to the (2n+1) output signals of the constant multiplier as the video signal of the interpolated scanning line (or the video signal for in-field interpolation processing) on the basis of the signal of the detected direction from the direction detecting section.

Differing from the invention described above, in the invention, in order to simplify the composition of the direction detecting section, the direction detecting section comprises a first subtracting section for obtaining the luminance level differences sampling points on the upper scanning line and the lower scanning line with respect to a plurality of directions including the vertical direction and the inclined directions centering around the interpolation point of the interpolated scanning line on the basis of the video signals of a plurality of sampling points on the upper scanning line and the lower scanning line, a first absolute value computing section for computing the absolute values of the luminance level differences obtained by the first subtracting section, and a first relative detecting section for comparing a plurality of absolute values obtained by the first absolute value computing section to detect the best correlating direction. More specifically, the composition of the direction detecting section can be simplified by composing the direction detecting section with the first subtracting section, the first absolute value computing section and the first relative detecting section.

Differing from the invention described above, in the invention, in order not only to simplify the composition of the direction detecting section but also to enable interpolation processing for the vertical line and the lines inclined leftward and rightward centering around the vertical line to be made properly, the first subtracting section comprises the (2n+1) units of subtracters for obtaining the luminance level differences of the sampling points on the upper scanning line and the lower scanning line with respect to the (2n+1) directions (n being an integer of 1 or more) including the vertical direction and the inclined lines centering around the interpolation point of the interpolated scanning line on the bases of the video signals of the upper scanning line and the lower scanning line; the first absolute value computing section comprises the (2n+1) units of absolute value computers for obtaining the absolute value of the luminance level difference obtained by each of the (2n+1) units of subtracters; the first relative detecting section compares the (2n+1) absolute values obtained by the (2n+1) units of the absolute value computers to detect the best correlating direction; the average value computing section computes the average value of the video signals of the 2 sampling points corresponding to the direction detected by the first relative detecting section out of the (2n+1) sampling points on the upper scanning line and the lower scanning line.

Differing from the previously discussed invention, in the invention, in order to prevent the interpolation processing from being made improperly due to the noise when the luminance level differences of the sampling points on the upper scanning line and the lower scanning line with respect to the (2n+1) directions, the first constant multiplying section for multiplying absolute value obtained by each absolute value computer by the coefficient $\frac{1}{2}^m$ (m being an integer of 1 or more) to output the result to the first relative detecting section is inserted between the (2n+1) units of absolute value computers constituting the first absolute value computing section and the first relative detecting section.

Differing from the previously discussed invention, in the invention, in order to precede the interpolation processing on the basis of the sampling point in the vertical direction when the absolute values of the luminance level differences of the sampling points on the upper scanning line and the downside scanning line in the (2n+1) directions are substantially equal, a vertical direction preceding subtracter for subtracting the set value from the output signal corresponding to the vertical direction out of the (2n+1) output signals of the first constant multiplying section to output the result to the first relative detecting section is provided.

Differing from the previously discussed invention, in the invention, in order to enable the interpolation processing to be made properly even when the smallest value is not existing in the absolute values of the luminance level differences of the sampling points on the upper scanning line and the lower scanning line in the (2n+1) directions, the first relative detecting section compares the (2n+1) absolute values, obtained by the first absolute value computing section, to output the signal corresponding to the detected one direction when the smallest value is existing, while outputting the signal for the detected vertical direction when the smallest value is not existing. In other words, the interpolation processing in the vertical direction is made to precede when the smallest value is not existing.

Differing from the invention discussed above, in the invention, in order to enable the interpolation processing to be made properly, even when the absolute values of the luminance level differences of the sampling points on the upper scanning line and the lower scanning line in the (2n+1) directions, the first relative detecting section compares the (2n+1) absolute values, obtained by a first absolute value computing section, to output the detected signal for the corresponding one direction out of the (2n+1) directions when the smallest value is existing, to output the gate signal when the absolute values are equal, and to output the signal for the detected vertical direction when another condition is existing, while providing the second subtracting section for obtaining the luminance level differences between the (2n+1) sampling points on the upper scanning line and the adjacent 2n sampling points, a second absolute value computing section for obtaining the absolute values of the luminance level differences obtained by the second subtracting section, a third absolute value computing section for obtaining the absolute values of the luminance level differences obtained by the third subtracting section, a second relative detecting section for comparing the 2n absolute values obtained by the second absolute value computing section to determine whether the smallest value is existing, a third relative detecting section for comparing the 2n absolute values obtained by the third absolute value computing section to determine whether the smallest value is existing or not, and a gate circuit, whose opening and closing is controlled by the gate signal outputted from the first relative detecting section, for outputting the detecting signal of the direction corresponding to the signals detected by the second and the third relative detecting sections.

Differing from the invention described above, in the invention, in order to prevent the interpolation processing from being made improperly due to the noise when the absolute values of the luminance level differences of the sampling points on the upper scanning line and the lower scanning line in the (2n+1) directions, a second constant multiplying section for multiplying each of the 2n absolute values, obtained by a second absolute value computing section, by the coefficient $\frac{1}{2}^v$ (v being an integer of 1 or more) to output the result to a second relative detecting section is inserted between the second absolute value computing section and the second relative detecting section, and a third relative detecting section for multiplying each of the 2n absolute values by the coefficient $\frac{1}{2}^v$ to output the result to the third relative detecting section is inserted between the third absolute value computing section and the third relative detecting section.

Differing from the invention described above, in the invention, in order to simplify the composition of the circuit (especially, the composition of the direction detecting section), the n in (2n+1) is set to 1. For instance, the direction detecting section for detecting the best correlating direction out of the (2n+1) directions is composed of the direction detecting section (where n=1) for detecting the most correlating direction out of the three directions, namely the vertical direction, direction inclining leftward at 45° and the direction inclining rightward at 45°.

Differing from the invention previously discussed, in the invention, the n in (2n+1) is set to 1.

BRIEF DESCRIPTION OF THE DRAWINGS

FIG. 6 illustrates the functions given in FIG. 4 and FIG. 5 and wherein (a) is a diagram for explaining the in-field interpolation processing and (b) a diagram for explaining the interfield interpolation processing.

BEST MODE FOR CARRYING OUT THE INVENTION

The scanning conversion circuit as the first embodiment of the present invention will be described in the following referring to the accompanying drawings. For the convenience of explanation, the video signal Vi to be outputted to the input terminal is the video signal of the NTSC system.

Figure 1:
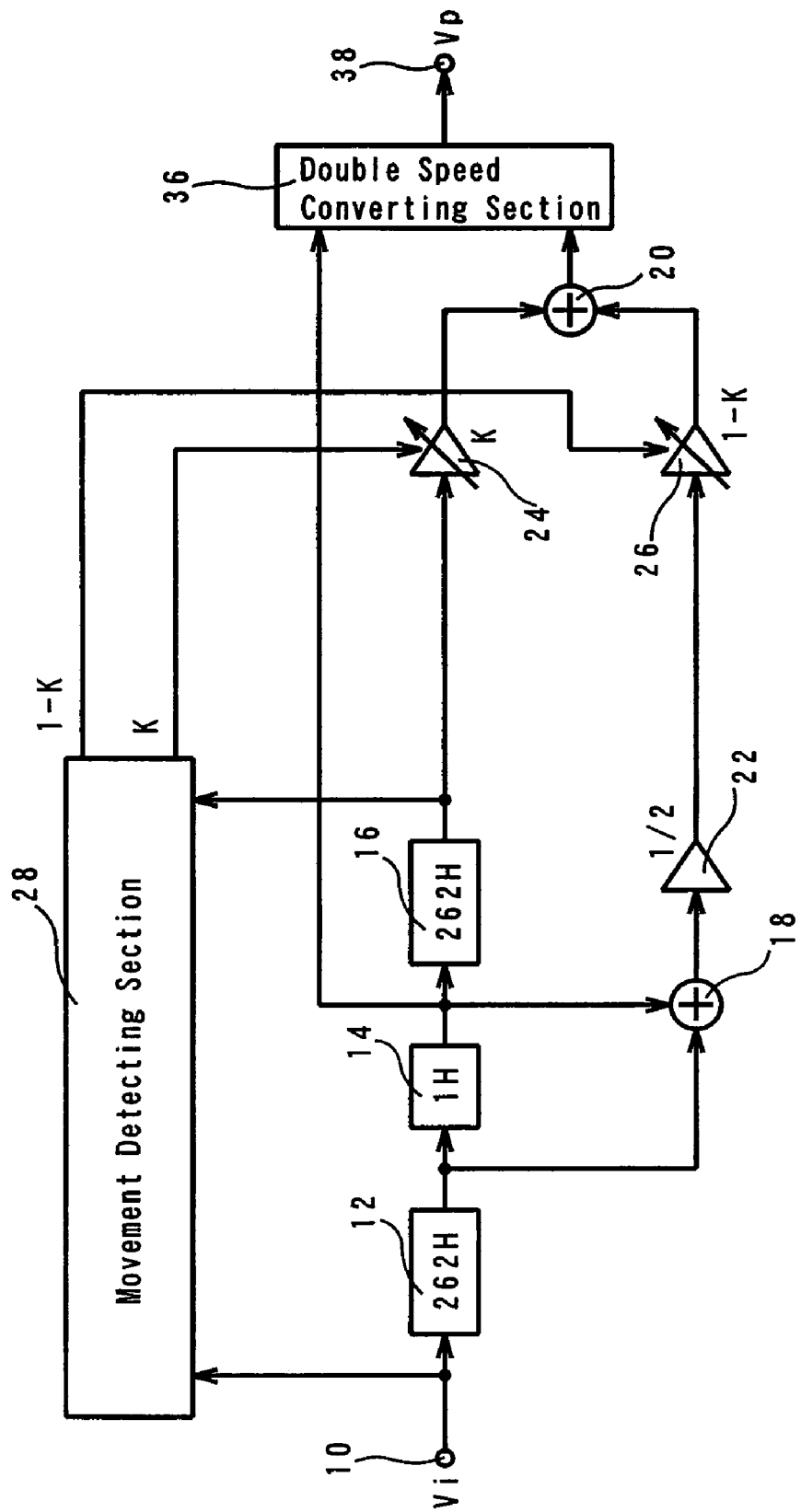
FIG. 1 is a block diagram illustrating the prior art.
Figure 2:
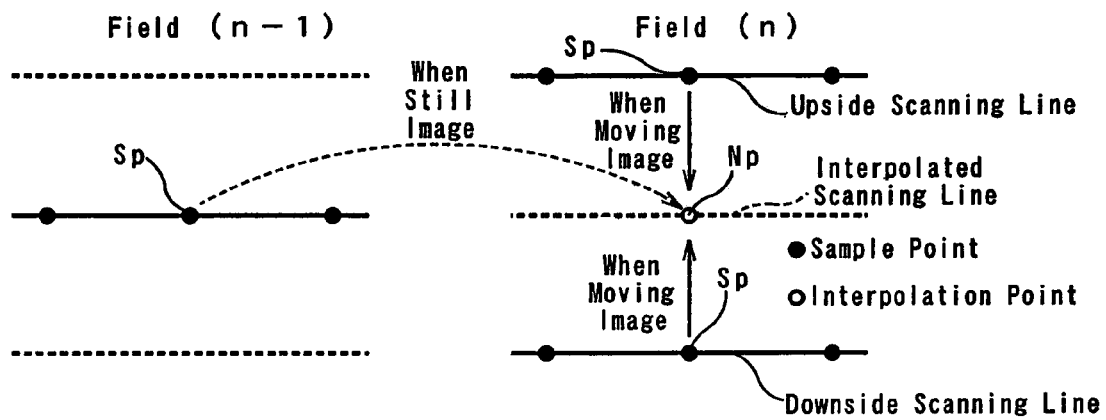
FIG. 2 illustrates the function given in FIG. 1, the in-field interpolation processing and the interfield interpolation processing.
Figure 3:
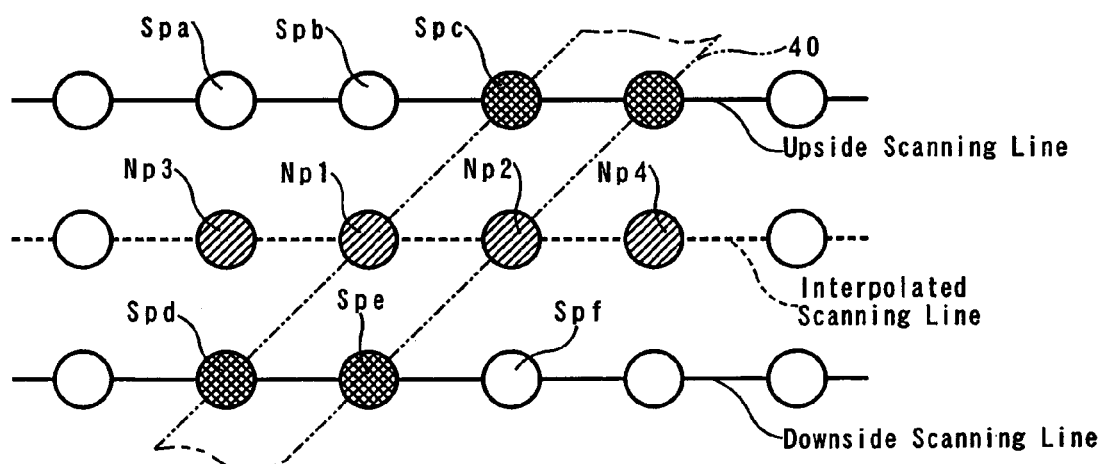
FIG. 3 illustrates the function given in FIG. 1 and the in-field interpolation processing of the inclined line in the moving image.
Figure 4:
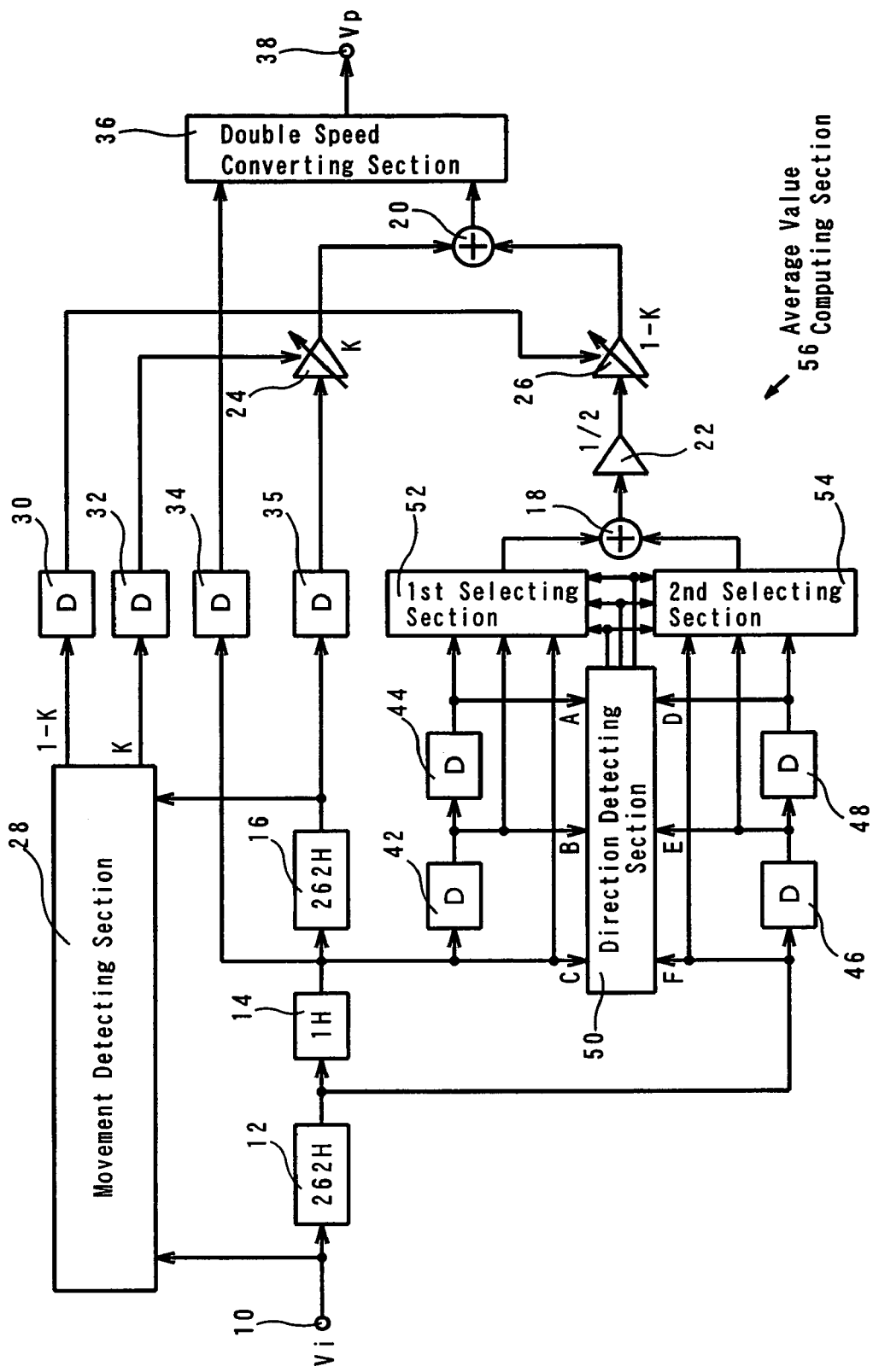
FIG. 4 is a block diagram illustrating the scanning conversion circuit as the first embodiment of the present invention.

In FIG. 4, the numerals 42, 44, 46 and 48 represent D-delayers; 50, the direction detecting section; 52, the first selecting section; 54, the second selecting section; the first and the second selecting sections 52 and 54, the adder 18 and the constant multiplier 22 constitute the average value computing section 56.

The D-delayers 42 and 44, for example, comprises the D-type flip-flop circuit and outputs the output signals of the 1H delayer 14 by sequentially delaying by 1 dot.

The D-delayers 46 and 48, for example, comprises the D-type flip-flop circuit and outputs the output signals of the 262H delayer 12 sequentially delaying by 1 dot.

The direction detecting section 50 detects the best correlating direction out of the three directions, namely the vertical direction, the direction inclining leftward at 45° and the direction inclining rightward at 45°, centering around the interpolation point of the interpolated scanning line out of the sampling points on the upper scanning line and the lower scanning line adjacent respectively to the interpolated scanning line, on the basis of each of the output signals C, B and A of the 1H delayer 14 and the D-delayer 42 and 44, and each of the output signals F, E and D of the 262H delayer 12 and D-delayers 46 and 48.

Figure 5:
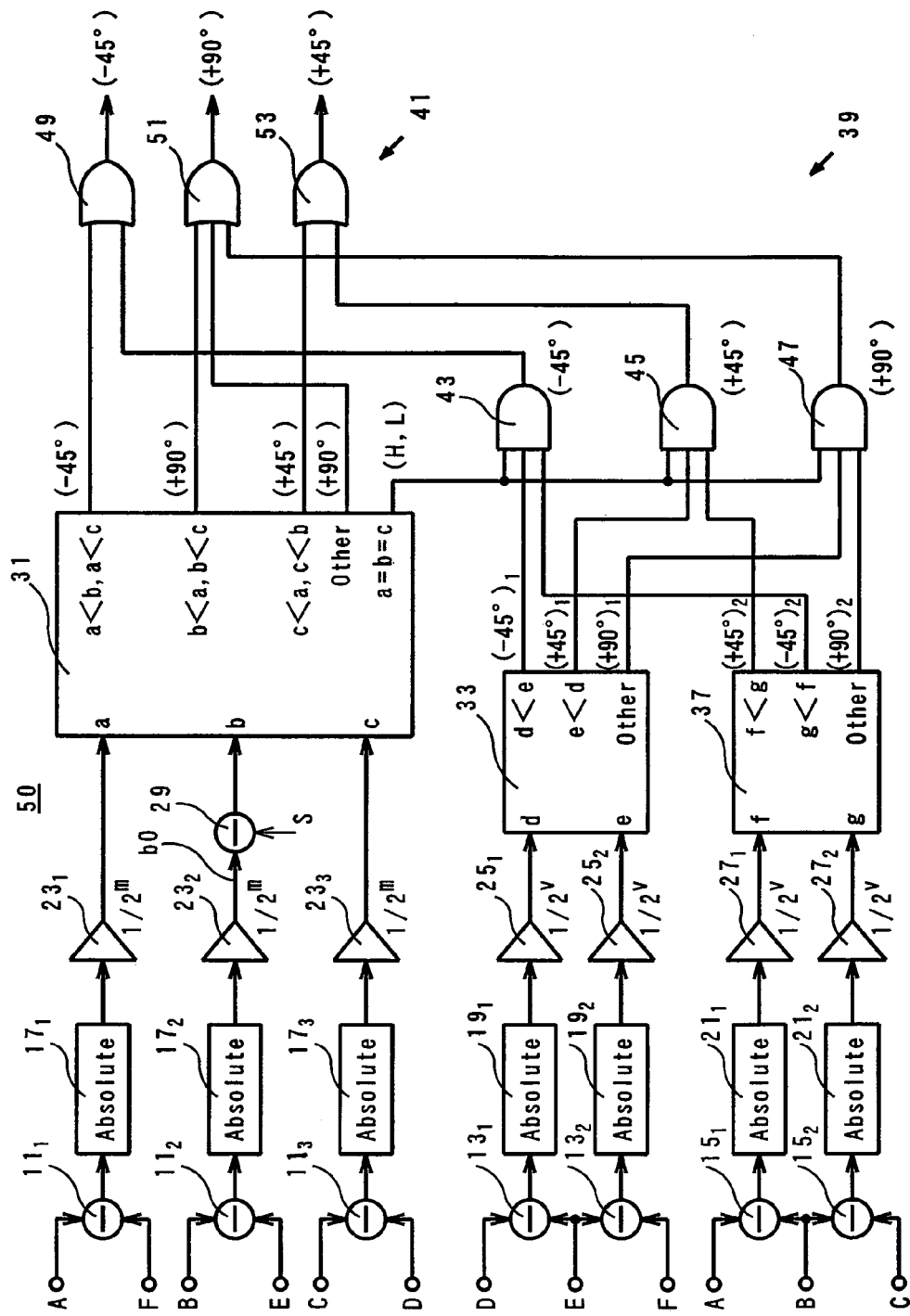
FIG. 5 is a block diagram specifically illustrating the direction detecting section given in FIG. 4.

The direction detecting section 50 is composed as specifically illustrated in FIG. 5.

As shown in FIG. 5, $11_1$–$11_3$ are 3 units of the first subtracters constituting the first subtracting section; $13_1$–$13_2$ are 2 units of the second subtracters constituting the second subtracting section; $15_1$–$15_2$ are 2 units of the third subtracters constituting the third subtracting section. $17_1$–$17_3$ are 3 units of the first absolute value computers constituting the first absolute value computing section; $19_1$–$19_2$ are 2 units of the second absolute value computers constituting the second absolute value computing section; $21_1$–$21_2$ are 2 units of the third absolute value computers constituting the third absolute value computing section.

$23_1$–$23_3$ are 3 units of the first constant multipliers constituting the first constant multiplying section; $25_1$–$25_2$ are 2 units of the second constant multipliers constituting the second constant multiplying section; $27_1$–$27_2$ are 2 units of the third constant multipliers constituting the third constant multiplying section.

29 represents the vertical direction preceding subtracter; 31, 33 and 37 correspond to the first, the second and the third relative detecting sections respectively; 39 and 41 are the first and the second gate circuits.

The first subtracters $11_1$, $11_2$ and $11_3$ compute the differences between each of the output signals A, B and C of the D-delayers 44 and 42 and each of the output signals F, E and D of the 262H delayer 12, the D-delayer 46 and 48 to obtain the luminance level differences of the sampling points on the upper scanning line and the lower scanning line in the direction inclining leftward at 45° (hereinafter referred to as (−45°) direction), the vertical direction (hereinafter referred to as (+90°) direction and the direction inclining rightward at 45° (hereinafter referred to as (+45°) direction).

The second subtracters $13_1$ and $13_2$ compute the differences between the output signals D and E and the output signals E and F to obtain the luminance level differences of the sampling points on the lower scanning line.

The third subtracters $15_1$ and $15_2$ compute the differences between the output signals A and B and the output signals B and C to obtain the luminance level differences of the sampling points on the upper scanning line.

The first absolute value computers $17_1$, $17_2$ and $17_3$ respectively compute the absolute values of the differences obtained by the first subtracters $11_1$, $11_2$ and $11_3$; the second absolute value computers $19_1$ and $19_2$ respectively compute the absolute values of the differences obtained by the second subtracters $13_1$ and $13_2$; the third absolute value computers $21_1$ and $21_2$ respectively compute the absolute values of the differences obtained by the third subtracters $15_1$ and $15_2$.

The first constant multipliers $23_1$, $23_2$ and $23_3$ respectively multiply the absolute values obtained by the first absolute value computers $17_1$, $17_2$ and $17_3$ by the coefficient $\frac{1}{2}^m$ to output the signals a, b0 and c; the second constant multipliers $25_1$ and $25_2$ respectively multiply the absolute values obtained by the second absolute value computers $19_1$ and $19_2$ by the coefficient $\frac{1}{2}^v$ to output the signals d and e; the third constant multipliers $27_1$ and $27_2$ respectively multiply the absolute values obtained by the third absolute value computers $21_1$ and $21_2$ by the coefficient $\frac{1}{2}^v$ to output the signals f and g.

The first constant multipliers $23_1$, $23_2$ and $23_3$ are, for example, respectively composed of the m-stage shift registers; the second constant multipliers $25_1$ and $25_2$, and the third constant multipliers $27_1$ and $27_2$, are, for example, respectively composed of the v-stage shift registers.

The subtracter 29 subtracts the predetermined value S from the output signal b0 of the first constant multiplier $23_2$ to output the resulting signal b.

The first relative detecting section 31 compares the output signals a, b and c to detect the (−45°) direction when a is the smallest value (a<b, a<c), to detect the (+90°) direction when b is the smallest value (b<a, b<c), to detect the (+45°) when c is the smallest value (c<a, c<b), to output the gate signal (e.g., H-level signal) when a=b=c and to detect the (+90°) when other conditions occur (e.g., a=b<c) respectively as being the best correlating direction.

The relative detecting section 33 compares the output signals d and e to output the signal (−45°) when d<e, to output the signal (+45°) when e<d, and to output the signal (+90°) when another condition is existing respectively as being the signal indicating the correlativity among the adjacent sampling points on the lower scanning line.

The third relative detecting section 37 compares the output signals f and g to output the signal $(+45°)_2$ when f<g, to output the signal $(−45°)_2$ when g<f, and to output the signal (+90°) when another condition is existing as being the signals respectively indicating the correlativity among the adjacent sampling points on the upper scanning line.

The first gate circuit 39 comprises the AND gates 43, 45 and 47, each of which opens when the gate signal from the first relative detecting section 31 is H-level (corresponding to a=b=c) and closes when the gate signal is L-level (other condition than a=b=c).

The AND gate 43 outputs the signal (−45°) corresponding to the best correlating direction when the gate signal from the first relative detecting section is H-level and when the signal $(-45°)_1$ and the signal $(-45°)_2$ are outputted from the second and the third relative detecting sections 33 and 37 respectively.

The AND gate 45 outputs the signal corresponding to (+45°) direction as being the best correlating direction when the gate signal from the first relative detecting section 31 is H-level, and when the second and the third relative detecting sections 33 and 37 output the signal $(+45°)_1$ and $(+45°)_2$ respectively.

The AND gate 47 outputs the signal corresponding to (+90°) as being the best correlating direction when the gate signal from the first relative detecting section 31 is H-level, and when the signal $(+90°)_1$ and the signal (+90°) are outputted respectively from the third relative detecting sections 33 and 37.

The second gate circuit 41 comprises the OR gates 49, 51 and 53.

The OR gate 49 outputs the OR signal, based on the signals outputted from the first relative detecting section 31 and the AND gate 43 respectively corresponding to the (−45°) direction, as being the best correlating direction.

The OR gate 51 outputs the OR signal, based on the signals outputted from the first relative detecting section 32 and the AND gate 47 corresponding to the (+90°) direction, as being the best correlating direction.

The OR gate 53 outputs the OR signal, based on the signals outputted from the first relative detecting section and the AND gate 45 corresponding to the (+45°) direction, as being the best correlating direction.

Returning to FIG. 4, the first selecting section 52 selects the video signal of the corresponding one sampling point out of the signals outputted from the 1H delayer 14 and the D-delayers 42 and 44 corresponding to the three sampling points (pixel points) on the upper scanning line, on the basis of the detected direction indicating signal of the direction detecting section 50.

The second selecting section 54 selects the video signal of the corresponding 1 sampling point out of the signals outputted from the 262H delayer 12 and the D-delayers 46 and 48 corresponding to the three sampling points on the lower scanning line, on the basis of the detected direction indicating signal of the direction detecting section 50.

The adder 18 adds the output signal of the first selecting section 52 and the output signal of the second selecting section 54, and the constant multiplier 22 multiplies the output signal of the adder 18 by the coefficient ½ to output the result as being the signal for the in-field interpolation processing.

Next, the functions given in FIG. 4 and FIG. 5 will be described referring with FIG. 6 and FIG. 7.

(1) The video signal Vi of the NTSC system inputted to the input terminal 10 is delayed by 1 frame +1 dot by means of the 262H delayer 12, 1H delayer 14, 262H delayer 16 and D-delayer 35 and inputted to the constant multiplier 24 as being the video signal for the interfield interpolation processing.

For instance, as indicated by an arrow in FIG. 6(b), with respect to the interpolation point Np on the interpolated scanning line of the field (n), the video signal of the sampling point Sp at the predetermined position on the scanning line of the field (n−1) corresponding to the field preceding by 1 field is inputted, as being the video signal for the interfield interpolation processing, to the constant multiplier 24.

(2) The signal C, obtained by delaying the input video signal by 1 dot by means of the 262H delayer 12 and the 1H delayer, the signal B further delayed by 1 dot by means of the D-delayer 42, the signal A further delayed by 1 dot by means of the D-delayer 44, the signal F obtained by delaying the input video signal Vi by 262H by means of the 262H delayer 12, the signal E obtained by further delaying by 1 dot by means of the D-delayer 46, and the signal D obtained by delaying by 1 dot by means of the D-delayer 48, are inputted to the direction detecting section 50. Then, with respect to the three directions, namely the vertical direction, the direction inclining leftward at 45° and the direction inclining rightward at 45°, the direction detecting section 50 obtains and compares the luminance level differences between the corresponding sampling points Spb, Spa and Spc on the upper scanning line and the corresponding sampling points Spe, Spf and Spd on the lower scanning line to detect the smallest value (i.e., the best correlating direction).

Next, the process through which the direction detecting section 50, previously discussed in (2), detects the best correlating direction will be detailed in (2-1) through (2-7).

(2-1) When the signals A, B, C, D, E and F are inputted respectively to the first subracters $11_1$, $11_2$ and $11_3$, the differences between the signals A, B and C and the signals F, E and D are obtained by the first subtracters $11_1$, $11_2$ and $11_3$ and the absolute values of the differences are obtained by the first absolute value computers $17_1$, $17_2$ and $17_3$.

The absolute values obtained by the first absolute value computers $17_1$ and $17_3$ are multiplied by the coefficient $½^m$ (e.g., ¼ where m=2) by means of the corresponding first constant multipliers $23_1$ and $23_2$ to suppress the effect of the noise component on the result of the detection and to be inputted, as the signals a and c, to the first relative detecting section 31.

The absolute value obtained by the first absolute value computer $17_2$ is multiplied by coefficient $½_m$ to become the signal b0, the effect of the noise component on which is suppressed and from which the predetermined value S is subtracted by the subtracter 29 to be inputted, as signal b giving priority to the detection of the vertical direction, to the first relative detecting section 31.

(2-2) The first relative detecting section 31 compares the inputted signals a, b and c to detect the (−45°) direction when a is the smallest value, to detect the (+90°) direction when b is the smallest value and to detect (+45°) direction when c is the smallest value respectively as being the best correlating direction, while outputting the gate signal (H-level signal) when a=b=c and outputting the signal for (+90°) direction as being the best correlating direction when another condition is existing. In this case, as is obvious from the above (2-1), out of the inputted three signals a, b and c, only from the signal b, as representing the best correlating direction, the set value S is subtracted, thereby preceding the (+90°) direction to the (−45°) direction and (+45°) direction. In other words, the vertical direction is given precedence.

(2-3) When the signals D, E and F are inputted to the second subtracters $13_1$ and $13_2$, the differences between the signals D and E and the signals E and F are obtained by the second subtracters $13_1$ and $13_2$ and then the absolute values thereof are obtained by the second subtracters $13_1$ and $13_2$.

When the signals A, B and C are inputted to the third subtracters $15_1$ and $15_2$, the differences between the signals A and B and the signals B and C are obtained by the third subtracters $15_1$ and $15_2$ and then the absolute values thereof are obtained by the third absolute value computers $21_1$ and $21_2$.

The absolute values obtained by the second absolute value computers $19_1$ and $19_2$ are multiplied by the coefficient $½^v$ to be outputted, as the signals f and g, to the third relative detecting section 37.

(2-4) The second relative detecting section 33 compares the inputted signals d and e to output the signal for $(-45°)_1$ when d<e, to output the signal for (+90°) when another condition is existing, respectively as being the signal representing the correlativity among the adjacent sampling points on the lower scanning line.

The third relative detecting section 37 compares the inputted signals f and g to output the signal for $(+45°)_2$ when f<g, to output the signal $(-45°)_2$ when g<f and to output the signal for $(+90°)_2$ when another condition is existing.

(2-5) When the gate signal outputted from the first relative detecting section 31 is H-level and when the signals for $(-45°)_1$ and $(-45°)_2$ are outputted respectively from the second relative detecting section 33 and the third relative detecting section 37, the signal for (−45°) direction as being the best correlating direction is outputted to the output side of the AND gate of the first gate circuit 39.

Similarly, when the gate signal outputted from the first relative detecting section 31 is H-level and when the signals $(+45°)_1$ and $(+45°)_2$ are outputted respectively from the second and third relative detecting sections 33 and 37, the signal for (+45°) direction, as being the best correlating direction, is outputted to the output side of the AND gate 45.

Similarly, when the gate signal outputted from the first relative detecting section 31 is H-level and when the second and the third relative detecting sections 33 and 37 respectively output the signal for $(+90°)_1$ and $(+90°)_2$, the signal for (+90°), as being the best correlating direction, is outputted to the output side of the AND gate 47.

(2-6) Therefore, the first relative detecting section 31 gives priority to the (+90°) direction (the vertical direction) over the direction inclining leftward at 45° and the direction inclining rightward at 45° centering around the interpolation point of the interpolated scanning line; however, under such a condition, when b is the smallest value (b<a, b<c), the (+90°) direction is detected as being the best correlating direction while detecting the (+45°) direction as being the best correlating direction when c is the smallest value (c<b, c<b).

In other conditions and when a=b=c does not hold, the (+90°) direction is detected as being the best correlating direction.

(2-7) Further, when a=b=c, the gate signal outputted from the first relative detecting section 31 becomes H-level, and the AND gates 43, 45 and 47 are opened to output the signals corresponding to the outputs from the second and third relative detecting sections 33 and 37.

More specifically, when the luminance level difference between the sampling points Spd and Spe are smaller than the luminance level difference between the sampling points Spe and Spf and when the luminance level difference between the sampling points Spb and Spc is smaller than the luminance level difference between the sampling points Spa and Spb (d<e and g<f), the signal for $(-45°)_1$ appears on the output side of the second relative detecting section 33, and the signal for $(-45°)_2$ appears on the output side of the third relative detecting section 37, while the signal for (−45°) direction, as being the best correlating direction, appears on the output side of the output side of the AND gate 43.

Further, similarly, when the luminance level difference between the sampling points Spe and Spf is smaller than the luminance level difference between the sampling points Spd and Spe and when the luminance level difference between the sampling points Spa and Spb is smaller than the luminance level difference between the sampling points Spb and Spc (e<d and f<g), the signal for (+45°) direction, as being the best correlating direction, is outputted to the output side of the AND gate 45.

In another condition, the signal for $(+90°)_1$ appears on the output side of the second relative detecting section 33, and the signal for $(+90°)_2$ appears on the output side of the third relative detecting section 37, while, similarly, the signal for (+90°), as being the best correlating direction, appears on the output side of the AND gate 47.

(3) Returning to FIG. 4, when the detected direction indicating signal from the direction detecting section 50 is inputted to the first selecting section 52, the first selecting section 52, on the basis of the detected direction indicating signal, selects the corresponding signal (e.g., signal C) for output from among the input signals C, B and A.

For instance, when the detected direction indicating signal from the direction detecting section 50 is for the direction inclining rightward at 45°, the video signal C is selected for output, the video signal C being of the sampling point Spc in the direction inclining rightward at 45° to the interpolation point Np out of the three sampling points Spa, Spb and Spc on the upper scanning line, as is shown in FIG. 6(a). Further, when the detected direction indicating signal is for the vertical direction or the direction inclining leftward at 45°, the video signal B of the sampling point Spb or the video signal A of the sampling point Spa, as is shown in FIG. 6(a) is selected for output.

(4) When the detected direction indicating signal from the direction detecting section 50 is inputted to the second selecting section 54, the second selecting section 54 selects, for output, the corresponding signal (e.g., signal D) from among the inputted signals F, E and D on the basis of the detected direction indicating signal.

For instance, when the signal of the detected direction from the direction detecting section 50 is for the direction inclining rightward at 45°, the video signal D corresponding to the sampling point Spd is selected for output, the sampling point Spd being one of the three sampling points Spd, Spe and Spf on the lower scanning line, in the direction inclining rightward at 45° with respect to the interpolation point Np as shown in FIG. 6(a). Further, similarly, when the detected direction indicating signal is for the direction inclining leftward at 45°, the video signal E corresponding to the sampling point Spe or the video signal F corresponding to the sampling point Spf, as are shown in FIG. 6(a), is selected for output.

(5) The adder 18 adds the output signal of the first selecting section 52 and the output of the second selecting section 54, while the constant multiplier 22 multiplies the output signal of the adder 18 by the coefficient ½ to output the result, as the video signal for the in-field interpolation processing, to the constant multiplier 26.

For instance, when the detected direction indicating signal is for the direction inclining rightward at 45°, the video signal C corresponding to the sampling point Spc on the upper scanning line and the video signal D corresponding to the sampling point on the lower scanning line, as are shown in FIG. 6(a), are added and multiplied by ½, and the resulting averaged video signal, as the video signal for the in-field interpolation processing, is outputted to the constant multiplier 26.

Further, when the signal of the detected direction corresponds to the vertical direction, the video signal B corresponding to the sampling point Spb on the upper scanning line and the video signal E corresponding to the sampling point Spd on the lower scanning line, as are shown in FIG. 6(a), are added and multiplied by ½, and the resulting averaged video signal, as the video signal for the in-field interpolation processing, is outputted to the constant multiplier 26.

(6) When the input video signal Vi and the signal obtained by delaying this input video signal Vi by 1 frame by means of the 262H delayer 12, 1H delayer 14 and 262H delayer 16 are respectively inputted to the movement detecting section 28, the movement detecting section 28 compares the corresponding video signals among the frames to detect the movement of the image to output the detected movement indicating signals (1−K) and K in which K=0 when the image is a moving image and K=1 when the image is a still image.

(7) Since the detected movement indicating signals (1−k) and K can become 1 and 0 (when K=0), only the video signal for the in-field interpolation processing outputted from the constant multiplier 22 is inputted to the conversion to double speed section 36 through the constant multiplier 26 and the adder 20.

Therefore, the conversion to double speed section 36 performs the processing for the conversion to double speed for the signal, which is obtained by delaying the video signal Vi by (263H+1D) by means of the 262H delayer 12, 1H delayer 14 and the D-delayer 34, and for the video signal for the in-field interpolation processing outputted from the adder 20, thereby outputting the video signal Vp for the progressive scanning to the output terminal 38.

Figure 7:
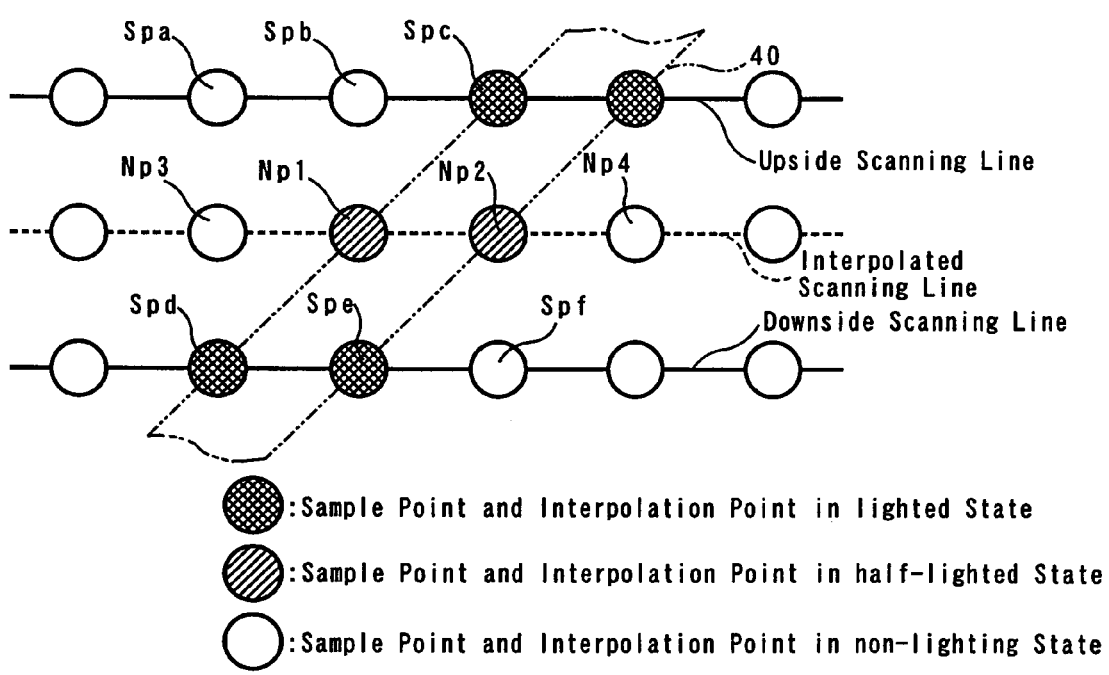
FIG. 7 illustrates the functions given in FIG. 4 and FIG. 5 and the in-field interpolation processing of the inclined line in the moving image.

(8) Therefore, when the line, having a 2-dot width and inclining rightward at 45° as is shown in FIG. 7, appears in a moving image, with respect to the interpolation point Np1, the direction detecting section 50 detects the vertical direction as being the best correlating direction, and, by using this direction indicating signal, the first and the second selecting sections 52 and 54 select the video signals B and E, respectively correspond to the sampling points Spb and Spe, which are in the non-lighted state on the upper scanning line and the lighted state on the lower scanning line and located at the positions respectively above and below with respect to the interpolation point Np1; the signals B and E selected by the first and the second selecting sections 52 and 54 averaged by the adder 18 and the constant multiplier 22 to obtain the video signal of the interpolation point Np1. Similarly, the video signal of the interpolation point Np2 is also obtained by averaging the video signals of the vertical direction sampling points. Therefore, the interpolation points Np1 and Np2 can be kept in half-lighted state, and, the interpolation points Np3 and Np4 can be kept in desirable non-lighted state because the direction inclining rightward at 45° is detected as being the most correlating direction, thereby preventing the inclined line 40 from appearing unnatural.

(9) In the case of the still picture, the movement detection signal (1−K) and K become 0 and 1 respectively (when K=1), so that only the video signal for the interfield interpolation processing (i.e., the video signal preceding by 1 field) outputted from the D-delayer 35 is inputted to the conversion to double speed section 36 through the constant multiplier 24 and the adder 20.

Therefore, the conversion to double speed section 36 performs the conversion to double speed processing for the signal, obtained by delaying the video signal Vi by (263H+1D) by means of the 262H delaying section 12, 1H delaying section 14 and the D-delayer 34, and the video signal for the interfield interpolation processing outputted from the D-delayer 35 to thereby output the video signal Vp for the progressive scanning to the output terminal 38.

Figure 8:
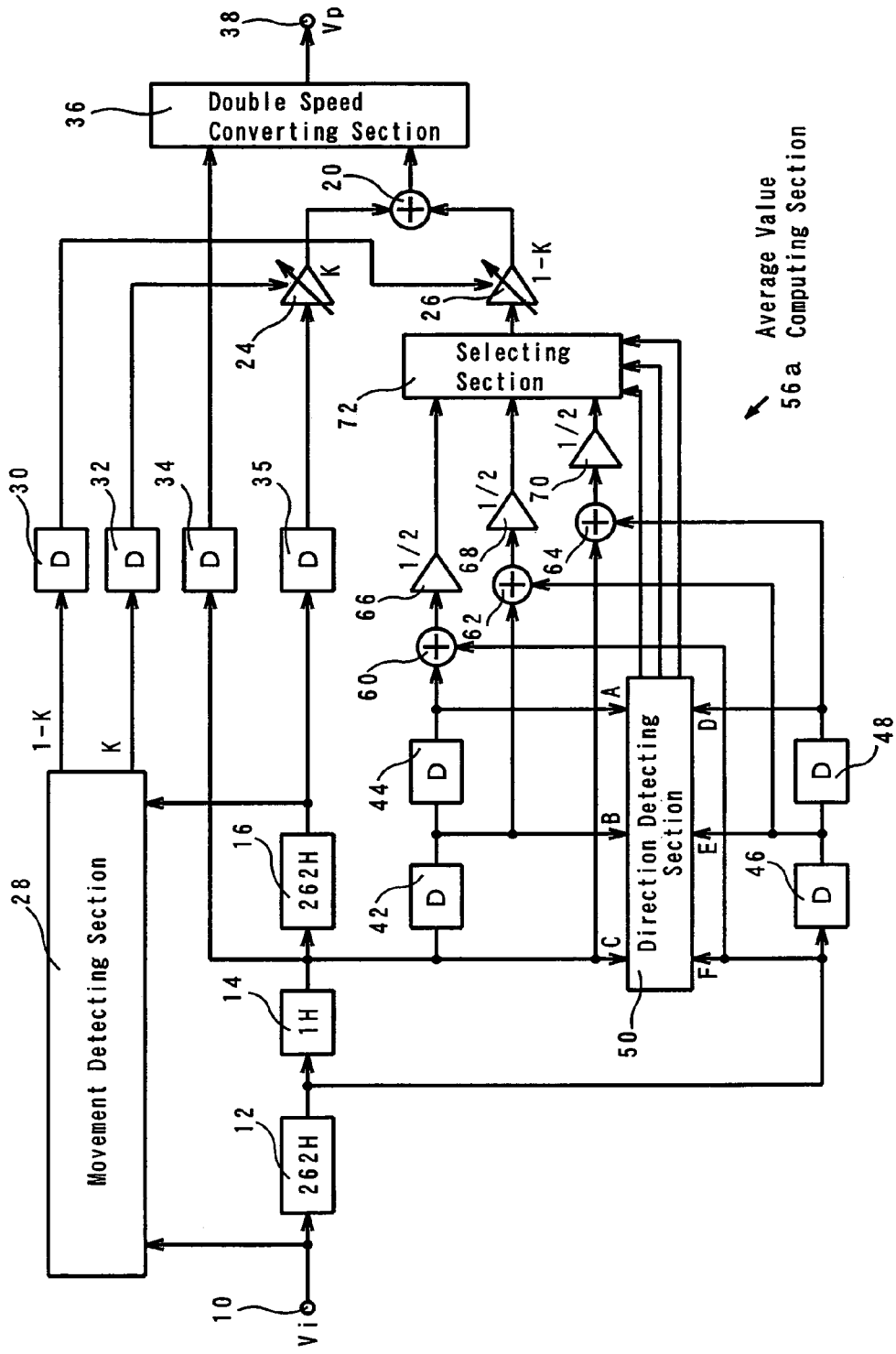
FIG. 8 is a block diagram illustrating the scanning conversion circuit as the second embodiment of the present invention.

In the case of the embodiment described by FIG. 4, the average value computing section comprises the first and the second selecting sections, the adder and the constant multiplier, but the present invention is not limited to this embodiment and is also applicable to the case where the average value computing section 56*a* comprises 3 units of adding sections 60, 62 and 64, 3 units of constant multipliers 66, 68 and 70, and the selecting section 72 as are shown in FIG. 8.

In FIG. 8, the adding section 60 adds the signal A and the signal F, while the constant multiplier 66 multiplies the output signal of the adding section 60 by the coefficient ½ to output the result.

Therefore, the constant multiplier 66 outputs, from its output side, the video signal, obtained by averaging the signal A and signal F respectively corresponding to the sampling point Spa on the upper scanning line and the sampling point Spf on the lower scanning line respectively located at 45° leftward to the interpolation point of the interpolated scanning line as is shown in FIG. 6(*a*).

Further, the adding section 62 adds the signal B and the signal E, while the constant multiplier 68 multiplies the output signal of the adding section 62 by the coefficient ½ to output the result.

Therefore, the constant multiplier 68 outputs, from its output side, the video signal, obtained by averaging the signal B and the signal E respectively corresponding to the sampling point Spb on the upper scanning line and the sampling point Spe on the lower scanning line respectively located vertically to the interpolation point Np of the interpolated scanning line as is shown in FIG. 6(*a*).

Further, the adding section 64 adds the signal C and the signal D, while the constant multiplier 70 multiplies the output of the adding section 64 by the coefficient ½ to output the result.

Therefore, the constant multiplier 70 outputs, from its output side, the video signal obtained by averaging the signal C and the signal D respectively corresponding to the sampling point Spc on the upper scanning line and the sampling point Spd on the lower scanning line respectively locating at 45° rightward to the interpolation point Np on the interpolated scanning line as shown in FIG. 6(*a*).

When the direction indicating signal from the direction detecting section 50 is outputted to the selecting section 72, the selecting section 72 selects one of the output signals of the three constant multipliers 66, 68 and 70 on the basis of the detected direction indicating signal to output it as the video signal for the in-field interpolation processing.

For instance, the selecting section 72 selects the output signal of the constant multiplier 66 when the detected direction indicating signal from the direction detecting section 50 indicates the direction inclining leftward at 45°, selects the output signal of the constant multiplier 68 when the detected direction indicating signal indicates the vertical direction, and selects the output signal of the constant multiplier 70 when the detected direction indicating signal indicates the direction inclining rightward at 45°.

In the case of the moving image, the detected movement indicating signals (1−K) and K from the movement detecting section 28 become 1 and 0 (where K=0), so that only the video signal for the in-field interpolation processing, outputted from the selecting section 72, is inputted to the double speed conversion section 36.

Therefore, the double speed conversion section 36 performs the double speed conversion processing for the signal obtained by delaying the video signal Vi by (263H+1D) and the video signal outputted from the adder 20 and outputs the video signal Vp for the progressive scanning to the output terminal 38.

Therefore, when the line 40 having a 2-dot width and inclining rightward at 45° appears in the moving image as shown in FIG. 7, the inclined line 40 can be prevented from appearing unnatural in a fashion similar to the case shown in FIG. 4.

In discussing the above embodiment, a method for simplifying the composition of the circuit according to the present invention (especially, the composition of the direction detecting section circuit designed for detecting the best correlating direction from among the three directions, namely the vertical direction, the direction inclining leftward at 45° and the direction inclining leftward at 45°) has also been discussed, but the present invention is not limited to this embodiment and is also applicable to the case of a circuit designed so that the best correlating direction is detected from among (2n+1) directions (n being an integer of 1 or more) including the vertical direction and the inclined directions.

For instance, the present invention is also applicable to the case where 2 is substituted for n in (2n+1) directions so that the direction detecting section can be designed for being capable of detecting the best correlating direction out of 5 directions comprising the vertical direction, the direction inclining leftward at 45°, the direction inclining rightward at 45°, the direction inclining leftward at 30° and the direction inclining rightward at 30°. In this case, a greater number of inclined lines in the moving image can be prevented from appearing unnatural without substantially adding to the complexity of the direction detecting section.

In relation to the embodiment discussed above, a case of an average value computing section designed for having a simpler circuit by comprising, as shown in FIG. 4, the first and the second selecting sections, the adding section and the constant multiplier and another case of an average value computing section designed, as shown in FIG. 8, to comprise the adding section, the constant multiplier and the selecting section, but the present invention is not limited to these embodiments and is also sufficiently applicable to any average value computing section designed for being capable of obtaining the average value of the video signals of the two sampling points corresponding to the directions detected by the direction detecting section.

In the above embodiment, the description is made as to the case where the detected movement indicating signals (1−K) and K of the movement detecting section 28 become 0 and 1 (i.e., K becomes 1) when the image is a still image, while the detected movement indicating signals (1−K) and K become 1 and 0 (i.e., K becomes 0) when the image is a moving image, but the present invention is not limited to this case and is also applicable to the case where the K in the detected movement indicating signals (1−K) and K takes any value other than the two values, i.e., 1 and 0 (e.g., K takes three different values, namely 1, ½ and 0).

For instance, the present invention is applicable to the case where the detected movement indicating signals (1−K) and K of the movement detecting section 28 become 0 and 1 (where K=1) when the image is a still image, the case where the detected movement indicating signals (1−K) and K of the movement detecting section 28 become 1 and 0 (where K=0) when the image moves slowly, and the case where the detected movement indicating signals (1−K) and K of the movement detecting section 28 become 1 and 0 (where K=0) when the image moves at more than a predetermined rate.

In the above embodiment, the explanation is made as to the case where the input video signal is of the NTSC system, but the present invention is not limited to this case and is also applicable to the case where the input video signal is of the PAL system or the SECAM system or the HDTV system.

For instance, when the input video signal is of the PAL system or the SECAM system, the present invention is applicable by displacing the 262H delayers 12 and 16, as are shown in FIG. 4 and FIG. 8, with the 312H delayer, and, when the input video signal is of the HDTV system, the present invention is also applicable by displacing the 262H delayers 12 and 15, as are shown in FIG. 4 and FIG. 8, with the 562H delayer.

In the above embodiment, the description is made as to the scanning conversion circuit according to the present invention wherein the movement detecting section is designed for detecting the movement of the image on the basis of the input video signal for the interlace scanning so that the video signal of the interpolation point is obtained by combining the video signal for the interfield interpolation processing with the video signal for the in-field interpolation processing according to the detected movement indicating signal and so that the video signal for the progressive scanning is obtained by subjecting the video signal of the interpolation point and the input video signal to the double speed conversion processing, but the present invention is not limited to this embodiment and is also applicable to the case where the movement detecting section is omitted.

Figure 9:
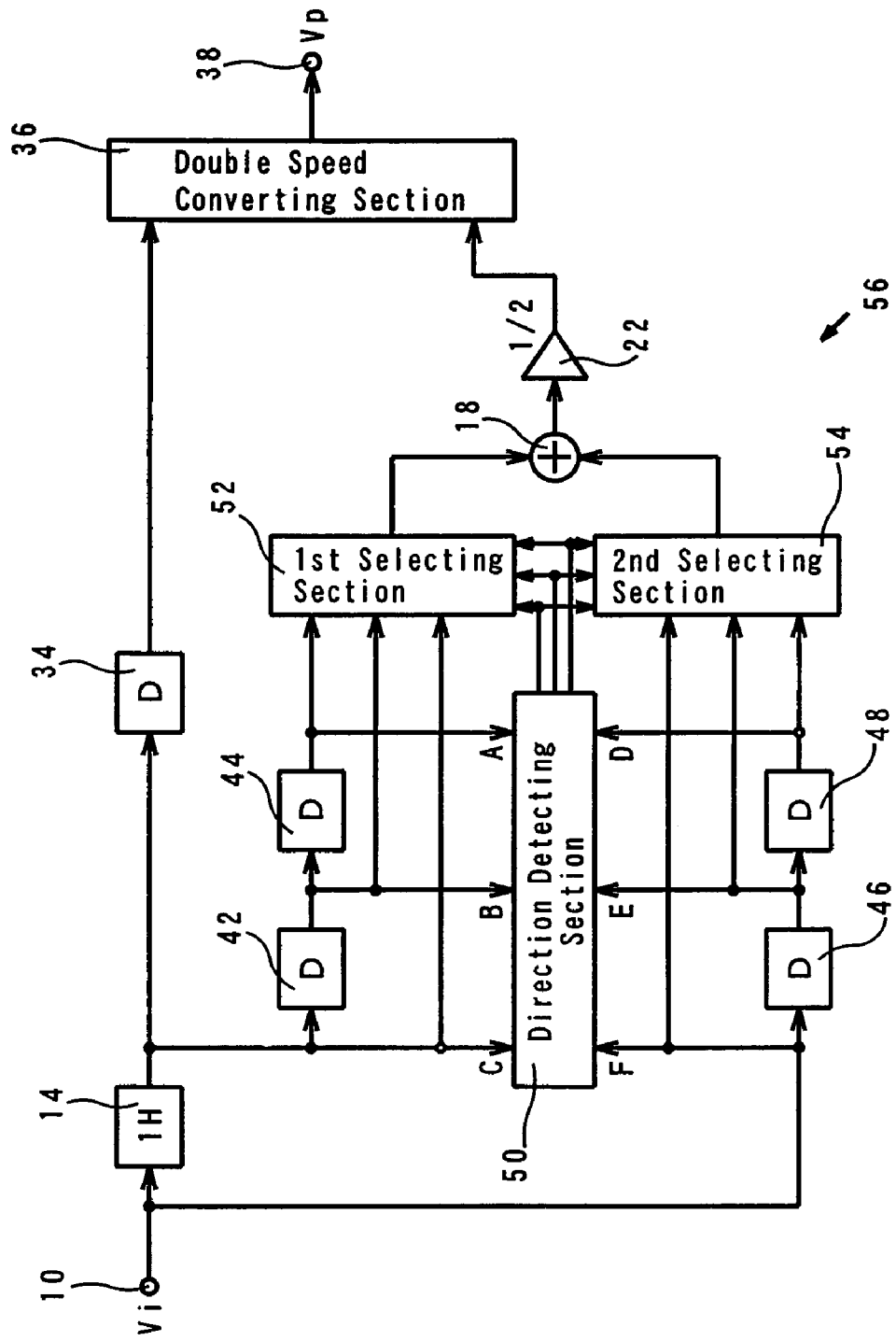
FIG. 9 is a block diagram illustrating the scanning conversion circuit as the third embodiment of the present invention.

For instance, the present invention is also applicable to the case where, as shown in FIG. 9, the 262H delayers 12 and 16, the movement detecting section 28, the constant multipliers 24 and 26, the D-delayers 30, 32 and 35, and the adder 20 which are shown in FIG. 4 are omitted; the signal, obtained by delaying the video signal Vi for the interlace scanning outputted to the input terminal 10, and the video signal of the interpolated scanning line obtained by the average value computing section 56 are inputted to the double speed conversion section 36 for the double speed conversion processing so that the video signal Vp for the progressive scanning is outputted to the output terminal 38.

In the above embodiment, the description is made as to the case where the present invention is applied to the scanning conversion circuit wherein the input video signal is used as the video signal for the interlace scanning and the output video signal is used as the video signal for the progressive scanning, but the present invention is not limited to this case and is also applicable to the scanning conversion circuit wherein the video signal of the interpolated scanning line is interpolated from the video signals of the upper scanning line and the lower scanning line which are respectively adjacent to the interpolated scanning line so as to output the video signal whose scanning line is doubled.

In the above embodiment, the description is made as to the case where the second constant multiplying section is inserted between the second absolute value computing section and the second relative detecting section, and the third constant multiplying section is inserted between the third absolute value computing section and the third constant multiplying section in order to prevent the interpolation processing from being made improperly due to the effect of the noise component when the absolute values of the luminance level differences between the sampling points on the upper scanning line and the sampling points on the lower scanning line in the (2n+1) directions including the vertical direction and the inclined directions are substantially equal, but the present invention is not limited to this case and is also applicable to the case where the insertion of the second constant multiplying section and the insertion of the third constant multiplying section are omitted.

In the above embodiment, the description is made as to the case not only designed so that, in order for the interpolation processing to be made properly even when the absolute values of the luminance differences of the sampling points on the upper scanning line and the lower scanning line in the (2n+1) directions including the vertical direction and the inclined directions are substantially equal; the first relative detecting section compares the (2n+1) absolute values, obtained by the first absolute value computing section, to output the detected direction indicating signal for the corresponding one direction when the smallest value is existing, to output the gate signal when the absolute values are equal, and to output the detected direction indicating signal for the vertical direction when another condition is existing but also is provided with the second and the third subtracters, the second and the third absolute value computing sections, the second and the third relative detecting sections and the gate circuit. However, the present invention is not limited to this case but is also applicable not only to the case designed so that the first relative detecting section compares the (2n+1) absolute values computed by the first absolute value computing section to detect the best correlating direction, but also applicable to the case where the second and third subtracters, the second and the third absolute value computing sections, the second and the third relative detecting sections and the gate circuit are omitted.

In the above embodiment, the description is made as to the case where, in order for the interpolation processing to be made properly even when the smallest value is not existing in the absolute values of the luminance level differences of the sampling points on the upper scanning line and the lower scanning line in the (2n+1) directions including the vertical direction and the inclined direction, the first relative detecting section compares the (2n+1) absolute values obtained by the first absolute value computing section to output the detected direction indicating signal for the corresponding one direction when the smallest value is existing and to output the detected direction indicating signal for the vertical direction when the smallest value is not existing. However, the present invention is not limited to this embodiment but is also applicable to the case designed so that the first relative detecting section compares the (2n+1) absolute values to detect the best correlating direction.

In the above embodiment, the description is made as to the case where, in order for the interpolation processing to be made properly even when the absolute values of the luminance level differences of the sampling points on the upper scanning line and the lower scanning line in the (2n+1) directions including the vertical direction and the inclined direction, the predetermined value is subtracted from the output signal corresponding to the vertical direction out of a plurality of output signals from the first constant multiplier to detect the best correlating direction, but the present invention is not limited to this embodiment and is also applicable to the case where the subtracter for giving priority is omitted.

In the above embodiment, in order to prevent the interpolation processing from being made improperly due to the effect of the noise component when the absolute values of the luminance level differences of the sampling points on the upper scanning line and the lower scanning line in the (2n+1) directions including the vertical direction and the inclined direction are relatively small, the first constant multiplying section, for multiplying the absolute values obtained by the (2n+1) units of absolute value computers by the coefficient $½^m$ (m being an integer of 1 or more) to output the results to the first relative detecting section, is inserted between the (2n+1) units of absolute value computers constituting the first absolute value computing section and the first relative detecting section, but the present invention is not limited to this case and is also applicable to the case where the insertion of the first constant multiplying section is omitted.

In the above embodiment, the description is made as to the case designed so that, in order for the interpolation processing to be made properly for the vertical direction and the direction inclining leftward and the direction inclining rightward centering around the interpolation point, the direction detecting section comprises the first subtracting section, the first absolute value computing section and the first relative detecting section so that the first relative detecting section compares the (2n+1) absolute values obtained by the (2n+1) units of absolute value computers to detect the smallest value as being the value corresponding to the best correlating direction. However, the present invention is not limited to this case and is also applicable to the case where the direction detecting section comprises the first subtracting section, the first absolute value computing section and the first relative detecting section; the first subtracting section obtains the luminance level differences of the sampling points on the upper scanning line and the lower scanning line in the (2n+1) directions including the vertical direction and the inclined directions centering around the interpolation point of the interpolated scanning line; the first absolute value computing section obtains the absolute values of the luminance level differences obtained by the first subtracting section; the first relative detecting section compares the (2n+1) absolute values obtained by the first absolute value computing section to detect the smallest value as being the value corresponding to the best correlating direction.

In the above embodiment, the description is made as to the case designed so that, in order to simplify the composition of the direction detecting section, the direction detecting section comprises the first subtracting section, the first absolute computing section and the first relative detecting section, but the present invention is not limited to this case and is also applicable to the case where the direction detecting section detects the best correlating direction out of the (2n+1) directions including the vertical direction and the inclined directions centering around the interpolation point of the interpolated scanning line, on the bases of a plurality of sampling points on the upper scanning line and the lower scanning line.

In the above embodiment, the description is made as to the case designed so that the direction detecting section detects the best correlating direction out of the (2n+1) directions including the vertical direction and the inclined directions, but the present invention is not limited to this case and is also applicable to the case designed so that the direction detecting section detects the best correlating direction out of the 2n directions (n being an integer of 1 or more) including the vertical direction and the inclined directions.

INDUSTRIAL APPLICABILITY

As discussed in the foregoing, the scanning conversion circuit according to the present invention is applicable to digital video signal processing for a display unit using the PDP or LCD, more specifically, in converting the video signal for the interlace scanning to the video signal for the progressive scanning and for preventing the vertical lines and the inclined lines in the moving image from appearing unnatural and leads to the reproduction of the high-quality moving image.

The invention claimed is:

1. A scanning conversion circuit for outputting a video signal with a scanning line doubled by interpolating a video signal of an interpolated scanning line from an input signal of an upper scanning line disposed adjacent above the interpolated scanning line and a lower scanning line disposed adjacently below the interpolated scanning line, the scanning conversion circuit comprising:

a direction detecting section for detecting the best correlating direction out of (2n+1) directions, n being an integer of at least 1, including a vertical direction, a direction inclining leftward and a direction inclining rightward, centering around an interpolation point of said interpolated scanning line on the basis of the input video signals of a plurality of sampling points on the upper scanning line and the lower scanning line, the direction detection section comprising:

a first subtracting section for obtaining the luminance level differences of the sampling points on the upper scanning line and the lower scanning line in a plurality of directions including the vertical direction and the inclined directions centering around the interpolation point of the interpolated scanning line, the first subtracting section comprising (2n+1) units of subtracters that each obtain the luminance level differences of the sampling points on the upper scanning line and the lower scanning line in the (2n+1) directions including the vertical direction and the direction inclining leftward and the direction inclining rightward centering around the interpolation point of the interpolated line on the basis of the video signals of the upper scanning line and the lower scanning line, a first absolute value computing section for obtaining the absolute values of the luminance level differences obtained by the first subtracting section, the first absolute value computing section comprising: (2n+1) units of absolute value computers for obtaining absolute values of the luminance level differences obtained by each of said (2n+1) units of subtracters, a first relative detecting section for comparing the absolute values obtained by the first absolute value computing section and detecting the best correlating direction, the first relative detecting section comparing the (2n+1) absolute values respectively obtained by the (2n+1) units of the absolute value computers and outputting a first signal indicating direction corresponding to the best correlating direction out of the (2n+1) directions such that a corresponding direction is indicated when a smallest absolute value exists, a gate signal is output when the absolute values are equal, and the vertical direction is indicated when another condition exists, a second subtracting section for obtaining 2n luminance level differences between (2n+1) sampling points of the upper scanning line and the adjacent sampling points, a third subtracting section for obtaining 2n luminance level differences between (2n+1) sampling points on the lower scanning line and adjacent sampling points, a second absolute value computing section for obtaining 2n absolute values of the 2n luminance level differences obtained by the second subtracting section, a third absolute value computing section for obtaining 2n absolute values of the 2n luminance level differences obtained by the third subtracting section, a second relative detecting section for comparing the 2n absolute values obtained by the second absolute value computing section, detecting whether a smallest value exists and outputting a second signal indicating direction, a third relative detecting section for comparing the 2n absolute values obtained by the third absolute value computing section, detecting whether a smallest value exists and outputting a third signal indicating direction, and a gate circuit having an opening and closing operation controlled by the gate signal outputted from the first relative detecting section and outputting a fourth signal indicating direction corresponding to the second and the third signals indicating direction; and an average value computing section for computing an average value of the video signals of two sampling points corresponding to the best correlating direction detected by said direction detecting section out of a plurality of the sampling points on the upper scanning line and the lower scanning line to thereby obtain the video signal of the interpolation point of the interpolated scanning line.

2. The scanning conversion circuit according to claim 1, wherein the direction detecting section further comprises: a first selecting section for selecting a video signal of one sampling point corresponding to the first signal indicating direction of the direction detecting section out of the (2n+1) sampling points of the upper scanning line, and a second selecting section for selecting a video signal of one sampling point corresponding to the first signal indicating direction out of the (2n+1) sampling points of the lower scanning line, and wherein the average value computing section comprises: an adding section for adding the signals selected by said first and second selecting sections, and a constant multiplier for multiplying the output signal of the adding section by the coefficient of ½ for obtaining the video signal of the interpolation point of the interpolated scanning line.

3. The scanning conversion circuit according to claim 1, wherein the average value computing section comprises: an adding section for adding video signals of two sampling points in each of the (2n+1) directions centering around the interpolation point of the interpolated scanning line, a constant multiplier for multiplying each of the (2n+1) output signals of the adding section by the coefficient ½, and a selecting section for selecting one output signal out of the (2n+1) output signals of said constant multiplier for obtaining the video signal for the interpolated scanning line on the basis of the detected direction indicating signal of the direction detecting section for obtaining the video signal of the interpolation point of the interpolated scanning line.

4. The scanning conversion circuit according to claim 1, wherein the direction detecting section further comprises: a subtracter corresponding to the vertical direction connected so that a predetermined value is subtracted from the output signal corresponding to the vertical direction out of the (2n+1) output signals of the first constant multiplier to thereby output the result to the first relative detecting section.

5. The scanning conversion circuit according to claim 1, wherein the first relative detecting section compares the (2n+1) absolute values obtained by the first absolute value computing section to output a signal indicating the corresponding detected direction out of the (2n+1) directions when a smallest value does exist, while outputting the detected direction indicating signal indicating the vertical direction when a smallest value does not exist.

6. The scanning conversion circuit according to claim 1, wherein the first relative detecting section compares the (2n+1) absolute values obtained by the first absolute value computing section to output a signal indicating the corresponding one direction out of the (2n+1) directions when a smallest value does exist, while outputting the signal indicating the vertical direction when a smallest value does not exist.

7. The scanning conversion circuit according to claim 4, wherein the first relative detecting section compares the (2n+1) absolute values obtained by the first absolute computing section to output the signal indicating corresponding one direction out of the (2n+1) directions when a smallest value does exist, to output the gate signal when the absolute values are equal, and to output the signal indicating the vertical direction when another condition exists.

8. The scanning conversion circuit according to claim 1, wherein the direction detecting section further comprises a second constant multiplying section for multiplying each of the 2n absolute values obtained by said second absolute value computing section by the coefficient of $½^v$, v being an integer of at least 1, and outputting the result to said second relative detecting section, the second constant multiplying section being inserted between the second absolute value computing section and the second relative detecting section, and a third constant multiplying section for multiplying each of the 2n absolute values obtained by the third absolute value computing section, the third constant multiplying section being inserted between the third absolute value computing section and the third relative detecting section.

9. The scanning conversion circuit according to claim 7, further comprising: a second constant multiplying section for multiplying each of the 2n absolute values obtained by said second absolute value computing section by the coefficient of $½^v$, v being an integer of at least 1, and outputting the result to said second relative detecting section, the second constant multiplying section being inserted between the second absolute value computing section and the second relative detecting section, and a third constant multiplying section for multiplying each of the 2n absolute values obtained by the third absolute value computing section and outputting the result to said third relative detecting section, the third constant multiplying section being inserted between the third absolute value computing section and the third relative detecting section.

10. The scanning conversion circuit according to claim 1, wherein n=1.

11. The scanning conversion circuit according to claim 6, wherein n=1.

12. The scanning conversion circuit according to claim 7, wherein n=1.

13. The scanning conversion circuit according to claim 4, wherein n=1.

14. The scanning conversion circuit according to claim 5, wherein n=1.

15. A scanning conversion circuit for detecting movement of an image on the basis of an input video signal for interlace scanning, for obtaining a video signal of an interpolation point by combining a video signal for interfield interpolation processing with a video signal for in-field interpolation processing to obtain the video signal of the interpolation point according to a movement detection signal, and for outputting a video signal for progressive scanning through a double speed conversion processing of the video signal of the interpolation point and the input video signal, the scanning conversion circuit comprising:

a direction detecting section for detecting the best correlating direction out of (2n+1) directions, n being an integer of at least 1, including the vertical direction and the direction inclining leftward and the direction inclining rightward centering around the interpolation point in an interpolated scanning line on the basis of a plurality of sampling points of the upper scanning line and the lower scanning line adjacent to the interpolated scanning line, the direction detecting section comprising:

a first subtracting section for obtaining luminance level differences of the sampling points on the upper scanning line and the lower scanning line in a plurality of directions including the vertical direction and the inclined directions centering around the interpolation point of the interpolated scanning line, the first subtracting section comprising (2n+1) units of subtracters for obtaining the luminance level differences of the sampling points on the upper scanning line and the lower scanning line in the (2n+1) directions, n being an integer of at least 1, including the vertical direction and the direction inclining leftward and the direction inclining rightward centering around the interpolation point of the interpolated line on the basis of the video signals of the upper scanning line and the lower scanning line, a first absolute value computing section for obtaining the absolute values of the luminance level differences obtained by the first subtracting section, the first absolute value computing section comprising (2n+1) units of absolute value computers for obtaining absolute values of the luminance level differences obtained by each of said (2n+1) units of subtracters, a first relative detecting section for comparing the absolute values obtained by the first absolute value computing section and detecting the best correlating direction, the first relative detecting section comparing the (2n+1) absolute values respectively obtained by the (2n+1) units of the absolute value computers and outputting a first signal indicating direction corresponding to the best correlating direction out of the (2n+1) directions such that a corresponding direction is indicated when a smallest absolute value exists, a gate signal is output when the absolute values are equal, and the vertical direction is indicated when another condition exists, a first constant multiplying section, disposed between the (2n+1) units of absolute value computers of the furst absolute value computing section and the first relative detecting section, for multiplying the absolute value obtained by each said absolute value computer by the coefficient of $½^m$, m being an integer of at least 1, and outputting the resulting product to the first relative detecting section, a second subtracting section for obtaining 2n luminance level differences between (2n+1) sampling points of the upper scanning line and the adjacent sampling points, a third subtracting section for obtaining 2n luminance level differences between (2n+1) sampling points on the lower scanning line and adjacent sampling points, a second absolute value computing section for obtaining 2n absolute values of the 2n luminance level differences obtained by the second subtracting section, a third absolute value computing section for obtaining 2n absolute values of the 2n luminance level differences obtained by the third subtracting section, a second relative detecting section for comparing the 2n absolute values obtained by the second absolute value computing section, detecting whether a smallest value exists and outputting a second signal indicating direction, a third relative detecting section for comparing the 2n absolute values obtained by the third absolute value computing section, detecting whether a smallest value exists and outputting a third signal indicating direction, and a gate circuit having an opening and closing operation controlled by the gate signal outputted from the first relative detecting section and outputting a fourth signal indicating direction corresponding to the second and the third signals indicating direction; and an average computing section for computing an average value of the video signals of two sampling points corresponding to the best correlating direction detected by said direction detection section out of a plurality of sampling points on the upper scanning line and the lower scanning line for obtaining the video signal for the in-field interpolation processing.

16. The scanning conversion circuit according to claim 15, wherein the direction detecting section further comprises: a first selecting section for selecting a video signal of one sampling point out of the (2n+1) sampling points of the upper scanning line on the basis of the first signal indicating direction of the direction detecting section, a second selecting section for selecting a video signal of one sampling point out of the (2n+1) sampling points of the lower scanning line on the basis of the first signal indicating direction of the direction detecting section, and a constant multiplier for multiplying the output signal of the adding section by the coefficient ½ for obtaining the video signal for the interpolation point of the in-field interpolation processing.

17. The scanning conversion circuit according to claim 15, wherein the average value computing section comprises: an adding section for adding video signals of two sampling points in each of the (2n+1) directions centering around the interpolation point of the interpolated scanning line, a constant multiplier for multiplying each of the (2n+1) output signals of the adding section by the coefficient ½, and a selecting section for selecting one output signal out of the (2n+1) output signals for obtaining the video signal of the interpolation point for the in-field interpolation processing on the basis of the first signal indication direction of the direction detecting section.

18. A scanning conversion circuit for outputting a video signal with a scanning line doubled by interpolating video signal of an interpolated scanning line from an input signal of upper and lower scanning lines disposed adjacently above and below, respectively, the interpolated scanning line, the scanning conversion circuit comprising:

a direction detecting section for detecting the best correlating direction out of (2n+1) directions, n being an integer of at least 1, including the vertical direction and the direction inclining leftward and the direction inclining rightward centering around an interpolation point of said interpolated scanning line on the basis of the input video signals of a plurality of sampling points on the upper scanning line and the lower scanning line, the direction detecting section comprising:

a first subtracting section for obtaining luminance level differences of the sampling points on the upper scanning line and the lower scanning line in a plurality of directions including the vertical direction and the inclined directions centering around the interpolation point of the interpolated scanning line, the first subtracting section comprising (2n+1) units of subtracters for obtaining luminance level differences of the sampling points on the upper scanning line and the lower scanning line in each of the (2n+1) directions, including the vertical direction and the direction inclining leftward and the direction inclining rightward centering around the interpolation point of the interpolated line on the basis of the video signals of the upper scanning line and the lower scanning line, a first absolute value computing section for obtaining absolute values of the luminance level differences obtained by the first subtracting section, the first absolute value computing section comprising (2n+1) units of absolute value computers for obtaining absolute values of the luminance level differences obtained by each of said (2n+1) units of subtracters, a first relative detecting section for comparing the absolute values obtained by the first absolute value computing section and detecting the best correlating direction, wherein the first relative detecting section compares the (2n+1) absolute values obtained by the first absolute value computing section, outputs a signal indicating a corresponding direction out of the (2n+1) directions when a smallest absolute value exists, outputs a gate signal when the absolute values are equal, and outputs a signal indicating the vertical direction when another condition exists, and a gate circuit having an opening and closing operation controlled by the gate signal outputted from the first relative detecting section to supply a signal indicating the best correlation direction; and an average value computing section for computing an average value of the video signals of the two sampling points corresponding to the direction detected by said direction detecting section out of a plurality of the sampling points on the upper scanning line and the lower scanning line to thereby obtain a video signal of the interpolation point of the interpolated scanning line.

19. The scanning conversion circuit according to claim 18, wherein the direction detecting section further comprises: a second subtracting section for obtaining 2n luminance level differences between (2n+1) sampling points of the upper scanning line and the adjacent sampling points, a third subtracting section for obtaining 2n luminance level differences between (2n+1) sampling points on the lower scanning line and adjacent sampling points, a second absolute value computing section for obtaining 2n absolute values of the 2n luminance level differences obtained by the second subtracting section, a third absolute value computing section for obtaining 2n absolute values of the 2n luminance level differences obtained by the third subtracting section, a second relative detecting section for comparing the 2n absolute values obtained by the second absolute value computing section, detecting whether a smallest value exists and outputting a second signal indicating direction, and a third relative detecting section for comparing the 2n absolute values obtained by the third absolute value computing section, detecting whether a smallest value exists, and outputting a third signal indicating direction, wherein the gate circuit selectively outputs a fourth signal indicating direction based upon the second and the third signals indicating direction.

* * * * *